United States Patent
Cheung et al.

(10) Patent No.: US 6,715,000 B2
(45) Date of Patent: Mar. 30, 2004

(54) METHOD AND DEVICE FOR PROVIDING HIGH DATA RATE FOR A SERIAL PERIPHERAL INTERFACE

(75) Inventors: Hugo Cheung, Tucson, CA (US); Lu Yuan, Carlsbad, CA (US); Ramesh Saripalli, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 192 days.

(21) Appl. No.: 10/012,913

(22) Filed: Oct. 22, 2001

(65) Prior Publication Data

US 2002/0133646 A1 Sep. 19, 2002

Related U.S. Application Data

(63) Continuation-in-part of application No. 09/810,994, filed on Mar. 16, 2001.
(60) Provisional application No. 60/288,915, filed on May 4, 2001.

(51) Int. Cl.$^7$ .............................................. G06F 13/28
(52) U.S. Cl. .............................. 710/28; 710/52; 710/26
(58) Field of Search ............................. 710/5, 28, 52, 710/22, 26; 711/123

(56) References Cited

U.S. PATENT DOCUMENTS

| | | | |
|---|---|---|---|
| 4,816,996 A | | 3/1989 | Hill et al. |
| 4,823,312 A | * | 4/1989 | Michael et al. ............... 710/71 |
| 5,047,927 A | * | 9/1991 | Sowell et al. ............... 709/212 |
| 5,278,956 A | * | 1/1994 | Thomsen et al. ........... 711/167 |
| 5,444,853 A | * | 8/1995 | Lentz ......................... 711/123 |
| 5,717,870 A | * | 2/1998 | Dobson ...................... 709/250 |

OTHER PUBLICATIONS

"Motorola's DSP568xx takes the low road: 3V, 120 mW, $10," Computer Design, Mar. 1996.
"Converting DSP56L811–Based Designs to the DSP56824" Motorola Technical Bulletin, Oct. 1, 1998, pp 1–14.

* cited by examiner

Primary Examiner—Kim Huynh
(74) Attorney, Agent, or Firm—W. Daniel Swayze, Jr.; W. James Brady; Frederick J. Telecky, Jr.

(57) ABSTRACT

An improved high performance scheme is provided with a serial peripheral interface (SPI) to enable microcontroller-based products and other components and devices to achieve a higher serial transmit and receive data rate. An exemplary technique utilizes a CPU and an SPI having a circular FIFO structure. To prevent the memory traffic associated with any SPI accesses from conflicting with other CPU memory accesses, the technique utilizes cycle stealing direct memory access techniques for SPI data transfers with the memory. During a CPU read/write sequence, data is read/written from/to the memory through a virtual special function register (SFR). Once the virtual SFR access is detected, all accesses are redirected to the circular FIFO buffer memory, with no additional pipelining necessary. The CPU pointers can suitably increment as appropriately controlled by hardware. In addition, once an SPI transmit/receive request is made, data communication can be established between the transmit/receive buffer and the memory. To avoid structural hazard, the transmit/receive request can be suitably pipelined until the next available clock phase, for example, within one instruction cycle. As a result, for a 4 Mhz clock rate, the technique can enable a significantly higher data transfer rate, e.g., at 250 Kbytes per second, an improvement of almost twenty times the prior art data rates. The high performance technique also avoids the firmware overhead with minimum hardware control cost. For example, compared to the hardware approach using deeper buffer structures, e.g., with FIFO buffers implemented using flip-flop devices, the exemplary techniques utilize memory, e.g., dynamic or static random access memory (DRAM or SRAM) with direct memory access (DMA).

6 Claims, 5 Drawing Sheets

METHOD AND DEVICE FOR PROVIDING HIGH DATA RATE FOR A SERIAL PERIPHERAL INTERFACE

CROSS REFERENCE TO RELATED APPLICATION

This Application is a Continuation-in-part of U.S. patent application Ser. No. 09/810,994, filed Mar. 16, 2001; furthermore, this application claims the benefit of, and priority to, provisional application Ser. No. 60/288,915, filed May 4, 2001; and both applications are hereby incorporated by reference in their entirety.

FIELD OF INVENTION

The present invention relates to a serial peripheral interface for use in microcontroller-based products. More particularly, the present invention relates to a method and device for providing a high data rate serial peripheral interface using virtual special function registers and direct memory access techniques.

BACKGROUND OF THE INVENTION

The demand for higher performance, microcontroller-based products for use in communication and processing applications continues to increase rapidly. As a result, manufacturers are requiring the components and devices within these microcontroller-based products to be continually improved to meet the design requirements of a myriad of emerging audio, video and imaging applications.

These microcontroller-based products use various types of processors, for example, general purpose microprocessors for controlling the logic of various digital devices, such as clock radios, microwave ovens, digital video recorders and the like, and special purpose microprocessors, such as math coprocessors for mathematical computations, or digital signal processors used in manipulating various types of information, including sound, imaging and video information. For the transmitting and receiving of data between various devices and components, microprocessors and other devices utilize various types of serial interfaces. One such type of interface definition typically used is the serial peripheral interface (SPI). In addition, for the temporary storage of data, for example, to permit the microprocessors to manipulate the data before transferring the data through the SPI to another device, the microprocessors generally utilize one or more buffers. These buffers are configured with the SPI's to enable the processors to transmit and receive data to and from the buffers as needed in an application.

In many SPI applications, due to the burst nature of the data communications and the limited hardware resources available, e.g., resulting from the high costs for dedicated transfer/receive buffers and control logic, the data to be transferred or received needs to be stored in the memory devices. Such approaches thus require undesirable amounts of overhead.

Upon operation of the SPI, the CPU communicates with the memory devices for data exchange, which may be achieved by firmware controls and the like. However, when the data rate is of a prime concern, this technique dramatically affects the microcontroller operation, resulting in undesirable performance.

For example, an SPI may provide for a data structure that organizes the memory in a circular FIFO buffer configuration having various pointers, such as a CPU transmit buffer write location, a CPU receive buffer write location, an SPI transmit shift operation location, and an SPI receive shift operation location. As a result, to maintain SPI operations, a significant number of clock cycles must be available. For example, to maintain the above pointers, at least 100 clock cycles are necessary. To handle any interrupt requests for each SPI transmit/receive interrupt, at least 150 clock cycles are required. Further, to maintain the circular buffer structure, including the circular buffer head/tail wrap around, at least 30 more clock cycles are necessary. Finally, any data move instructions either to or from the memory devices would require approximately 30 or more clock cycles. As a result, over 300 clock cycles are required. Based on a clock rate of 4 MHz, the translates into a data rate of only 13 Kbytes per second, an undesirably low data rate.

Accordingly, a need exists for an improved, high performance scheme for a serial peripheral interface to provide a data rate which does not require high overhead.

SUMMARY OF THE INVENTION

The serial peripheral interface and high performance data transmission and receiving scheme according to the present invention addresses many of the shortcomings of the prior art. In accordance with various aspects of the present invention, an improved high performance scheme is provided with a serial peripheral interface (SPI) to enable microcontroller-based products and other components and devices to achieve a higher serial transmit and receive data rate. In accordance with an exemplary embodiment, an exemplary technique utilizes a CPU and an SPI having a circular FIFO structure, configured with a single port memory device. To prevent the memory traffic associated with any SPI accesses from conflicting with other CPU memory accesses, the technique utilizes cycle stealing direct memory access techniques for SPI data transfers with the memory.

In accordance with an exemplary embodiment, during a CPU read/write sequence, data is read/written from/to the memory through a virtual special function register (SFR). Once the virtual SFR access is detected, all accesses are redirected to the circular FIFO buffer memory, with no additional pipelining necessary. The CPU pointers can suitably increment as appropriately controlled by hardware. In addition, once an SPI transmit/receive request is made, data communication can be established between the transmit/ receive buffer and the memory. To avoid structural hazard, the transmit/receive request can be suitably pipelined until the next available clock phase, for example, within one instruction cycle. As a result, for a 4 Mhz clock rate, the technique can enable a significantly higher data transfer rate, e.g., at 250 Kbytes per second, an improvement of almost twenty times the prior art data rates.

In accordance with another aspect of the present invention, the high performance technique avoids the firmware overhead with minimum hardware control cost. For example, compared to the hardware approach using deeper buffer structures, e.g., with FIFO buffers implemented using flip-flop devices, the exemplary techniques utilize memory, e.g., dynamic or static random access memory (DRAM or SRAM) with direct memory access (DMA).

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF EXEMPLARY EMBODIMENTS OF THE INVENTION

The present invention may be described herein in terms of various functional components and various processing steps. It should be appreciated that such functional components may be realized by any number of hardware or structural components configured to perform the specified functions. For example, the present invention may employ various integrated components, e.g., buffers, voltage and current references, I/O devices, memory components and the like, comprised of various electrical devices, e.g., resistors, transistors, capacitors, diodes or other devices, whose values may be suitably configured for various intended purposes. In addition, the present invention may be practiced in any microcontroller-based application. Such general applications that may be appreciated by those skilled in the art in light of the present disclosure are not described in detail herein. However for purposes of illustration only, exemplary embodiments of the present invention will be described herein in connection with a SPI interface for a master device, such as a microprocessor, or a slave device, such as an A/D converter. Further, it should be noted that while various components may be suitably coupled or connected to other components within exemplary circuits, such connections and couplings can be realized by direct connection between components, or by connection through other components and devices located therebetween.

In accordance with an exemplary embodiment of the present invention, a first microcontroller may communicate with a second microcontroller. The microcontrollers may include interface modules such as a serial peripheral interface device, wherein one of the serial peripheral interface devices operates as a "master device" to drive the synchronization of the data transfer between the master device and the other "slave device". The master device may be, for example, a personal computer. The slave device may be, for example, memory, a digital-to-analog converter, or an analog-to-digital converter. Analog-to-digital devices may, for example, measure humidity or temperature and convert that reading into a digital formal which can be provided back to the master device for processing.

Figure 1:
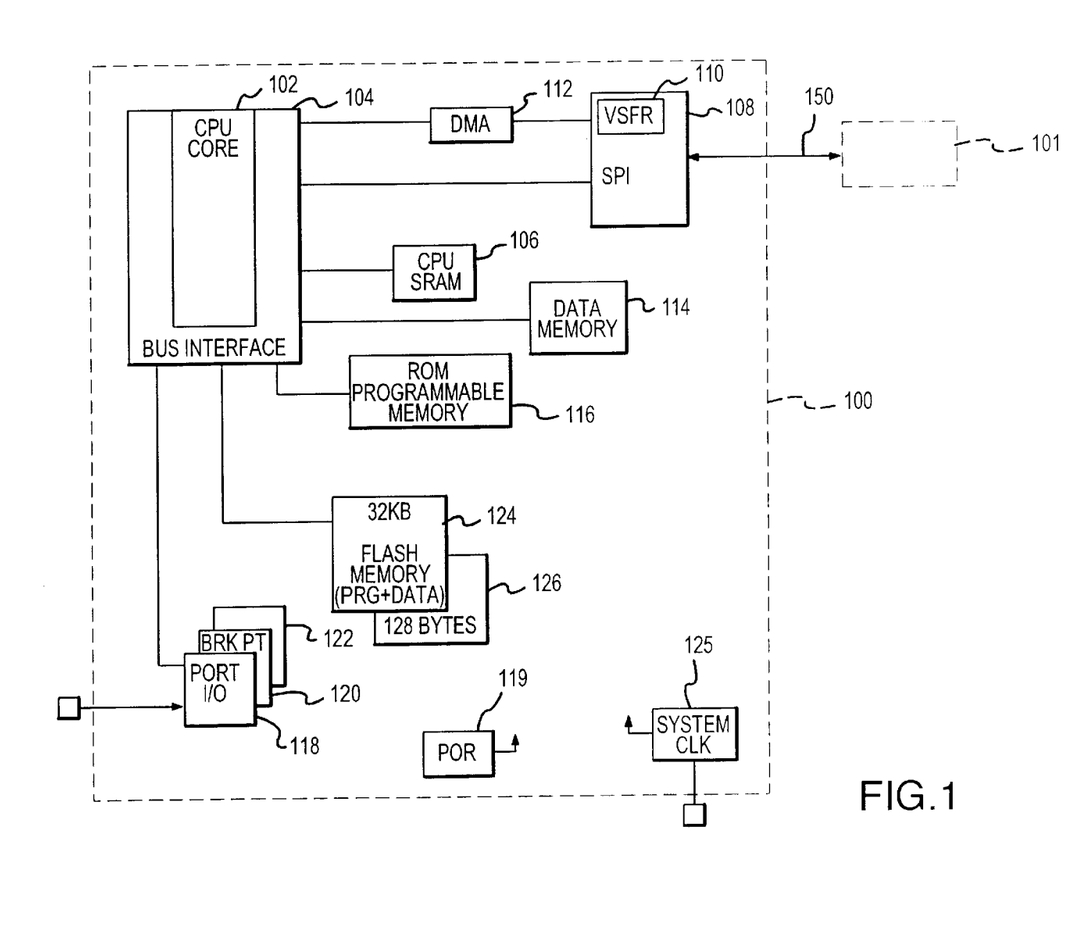
FIG. 1 illustrates a block diagram of an exemplary microcontroller system which can implement the techniques and devices of the present invention.

For example, with reference to FIG. 1, an exemplary microcontroller 100 is illustrated. However, it should be noted that the exemplary embodiments of the present invention may be suitably implemented in any microcontroller configuration. In accordance with an exemplary embodiment, microcontroller 100 is suitably configured in communication with microcontroller 101 via communication path 150. Microcontroller 100 suitably comprises a central processing unit (CPU) core 102 configured for the processing of data, and a Bus Interface ("BusIF") 104 for communication with the various memory or input and output devices. For the storage of data, microcontroller 100 can comprise various types of memory. For example, microcontroller 100 can comprise an internal CPU memory 106 which can be implemented using static random access memory (SRAM) and the like which can provide very low access time, e.g., as low as 10 nanoseconds. In addition, microcontroller 100 can also include data memory 114 which can also comprise SRAM-type memory, and read-only memory (ROM) 116 which can comprise the non-reprogrammable memory for the microcontroller 100. Still further, microcontroller 100 can also include flash memory for the programming and storage of data, such as a large page of memory 124 comprising, for example, 32 KB of data storage, as well as a smaller configuration of flash memory 126, comprising, for example, 128 bytes.

For the transmitting and receiving of data between various components, microprocessor 100 can also comprise serial peripheral interface (SPI) 108. SPI 108 may communicate directly with CPU core 102 via BusIF 104 or may communicate directly with the CPU memory 106 via direct memory access (DMA) 112 and BusIF 104. In other words, SPI 108 can transfer data to and from memory without passing the data through the CPU. Furthermore, SPI 108 can transmit and receive information from other microcontroller devices. For example, SPI 108 may communicate, over communications path 150, with microprocessor device 101. SPI 108 may be an integral part of a peripheral device or may be a stand alone interface apart from and in communication with the peripheral device.

SPI 108 may comprise various components and may communicate with various signal paths. In an exemplary embodiment, SPI 108 comprises shift registers for receiving and sending data via communication lines such as: Master In Slave Out and Master Out Slave In lines. SPI 108 may further be configured to operate in either a master or slave mode. Further information regarding SPI configurations and operation and master/slave shift register and shift buffer configurations and operation may be obtained in the referenced U.S. patent application, Ser. No. 09/810,994, entitled "Serial Peripheral Interface With High Performance Buffering Scheme", having common inventors and assignee with this application.

In addition, microcontroller 100 can also include various input/output devices. For example, an I/O port device 118 can be provided, as well as a breakpoint device 120. Further, microcontroller 100 can also include a system clock 125 for providing clock cycles for triggering various functions and sequences during operation. Microcontroller 100 can also include a Power On Reset (POR) 119 for use during ramping up of a power supply.

As discussed above, previous attempts for providing data transmission with an SPI comprise firmware solutions that provide very low data rates, or hardware solutions that involve high overhead, e.g., very deep and complex transmit/receive buffer and FIFO buffer configurations, as well as additional control logic, without significant improvement in the data rates to desirable levels. However, in accordance with various aspects of the present invention, an improved high performance scheme is provided with a serial peripheral interface (SPI) to enable microcontroller-based products and other components and devices to achieve a higher serial transmit and receive data rate.

In accordance with an exemplary embodiment, an exemplary technique utilizes a CPU and an SPI having a circular FIFO structure, configured with a single port memory device. To prevent the memory traffic associated with any SPI accesses from conflicting with other CPU memory accesses, the technique utilizes cycle stealing direct memory access techniques for SPI data transfers with the memory. The cycle stealing direct memory access (DMA) techniques may be employed such that the DMA module waits until the CPU is not using the bus interface before the DMA module transfers data between the serial peripheral interface and memory. Therefore, the central processing unit may not have to give up cycle time for that communication to occur. Thus, the DMA module can be said to be "stealing time" that the central processing unit is not using on the bus interface. As a result, the central processing unit is not slowed down and, furthermore, instructions are not required from the central processing unit to carry out these steps, with the overall effect being to increase the speed of the microcontroller and the data transmission.

Figure 2A:
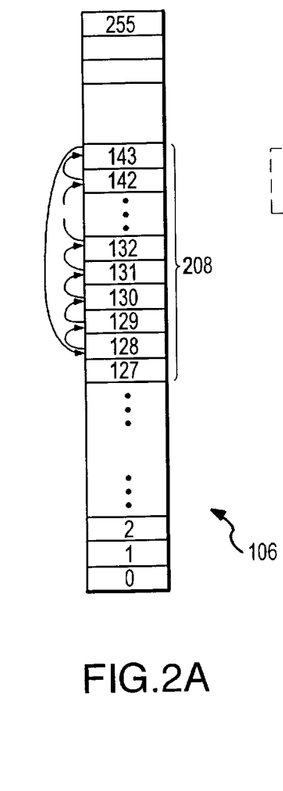
FIG. 2A illustrates an exemplary memory stack in accordance with an exemplary embodiment of the present invention.

In accordance with an exemplary embodiment of the present invention, CPU memory may be apportioned so as to reserve a predetermined portion of the memory addresses for use as buffer memory. With reference to FIG. 2A, although any portion of CPU memory may be used, in an exemplary embodiment, CPU memory 106 has 256 address locations. In this example, 256 memory address locations are represented in FIG. 2A in a linear fashion. A portion of these memory address locations may be designated as buffer memory. These buffer memory address locations may be reserved to temporarily store data being sent and received, and may improve the speed and efficiency of the data transmission and central processing unit processing. The buffer memory may be any size, and reserved out of any portion of CPU memory 106. However, in an exemplary embodiment, the buffer memory begins at memory address 128 and may be a maximum of 128 consecutive addresses ending at memory address 255. In FIG. 2A, for example, buffer memory 208 begins at memory address location 128 and ends at memory address location 143.

Figure 2B:
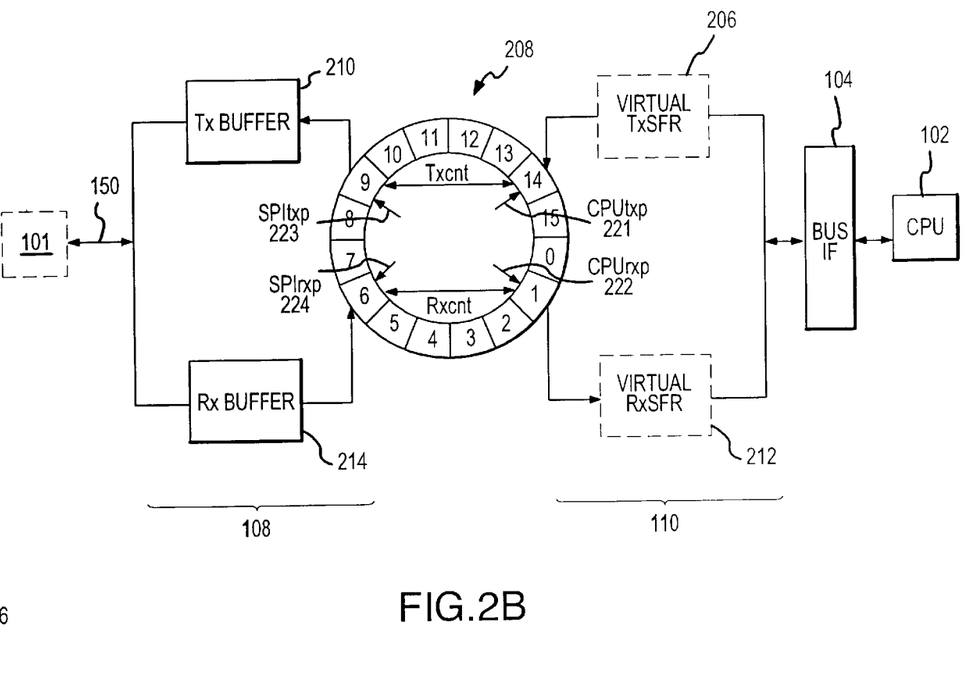
FIG. 2B illustrates a block diagram of an exemplary data transfer technique in accordance with an exemplary embodiment of the present invention.

With reference to FIG. 2B, buffer memory 208 may be utilized in a circular First In First Out ("FIFO") buffer memory scheme. In one embodiment of the present invention, for example, the CPU memory 106 is physically a linear array, but buffer memory 208 is conceptually arranged end-to-end in a circle. In accordance with this embodiment, the size of buffer memory 208 is flexible and may be programmed by providing a starting address and ending address. Upon providing the starting and ending addresses, hardware in SPI 108 can be configured to cause the designated buffer memory to act as a circular FIFO memory structure with no further software intervention. For example, the hardware keeps track of the pointers and counters for the FIFO buffer memory 208. Furthermore, hardware configuration in SPI 108 provides, for example, the automated responses to signals and requests from the BusIF and DMA module. Thus, for example, with reference again to FIG. 2A, a pointer progressing through the memory locations would move from 128 to 129, from 129 to 130, and so forth to 143, and then return to memory address location 128. It should be noted that in order to have a circular FIFO buffer, a minimum of two memory address locations are required in buffer memory 208.

The circular FIFO buffer may be used, in one exemplary embodiment of the present invention, to buffer the transmission of information from CPU 102 to other devices. For example, CPU 102 may transmit data to the SPI which is then stored on the FIFO buffer for later transmission by the SPI to a connected device. Data may be transmitted and received simultaneously. With reference to FIG. 2B, in accordance with an exemplary embodiment, a CPU 102 may be configured to communicate with connected devices via BusIF 104, virtual special function register (V-SFR) 110, FIFO buffer 208, SPI 108, and communication lines 150. V-SFR 110 may comprise virtual transmitter register 206 and virtual receiver register 212. SPI 108 may comprise transmitter buffer 210 and receiver buffer 214. During a CPU read/write sequence, data can be read/written from/to memory 208 through virtual special function registers 212 and 206.

CPU 102 may communicate data to BusIF 104, and BusIF 104 may in turn provide the data to a virtual SFR which may store the data in FIFO buffer memory 208. This data is written to FIFO buffer memory 208 by virtual SFR transmitter 206. This data may later be removed from FIFO buffer memory 208 by SPI transmitter buffer 210. The data may then be sent out over communication channel 150. As SPI transfer buffer 210 sends out each byte over lines 150 to a second device 101, a byte is received on SPI receive buffer 214 which may then be transferred to FIFO buffer memory 208, where the byte can be recalled by virtual SFR receiver 212 to be provided to CPU 102 via BusIF 104.

The CPU pointers, CPUtxp 221 and CPUrxp 222, can suitably increment to indicate the current location for data storage and retrieval on FIFO 208 by CPU 102. The SPI pointers, SPItxp 223 and SPIrxp 224, can suitably increment to indicate the current address for retrieval and storage of data from/on FIFO 208 by SPI 108 respectively. As mentioned above, hardware in, for example, SPI 108 keeps track of the pointers. Thus, the CPU and the DMA module are not aware that pointers exist, but act as though the data were written to a SFR. Thus CPU 102 and the DMA module do not have to keep track of where the data was temporarily stored other than a single special VSFR address.

In this exemplary embodiment, a transmitter buffer counter, Txcnt, can count the bytes of data that are stored on buffer 208 awaiting transmission to other microprocessors. A receiver buffer counter, Rxcnt, can count the bytes that are stored on buffer 208 awaiting transmission to CPU 102. These counters are tracked via hardware in SPI 108. Further information regarding aspects and embodiments of the FIFO buffer and virtual SFR operation may be obtained via reference to parent U.S. patent application Ser. No. 09/810,994.

Furthermore, in an exemplary embodiment of the present invention, threshold values are programmed where if the transmit counter is below a predetermined value, e.g. 10 bytes are waiting for transmission from the FIFO buffer, an interrupt (CPU_Txirq) is sent to the CPU alerting the CPU that more data can be written to the FIFO buffer. Similarly, if the receive counter is greater than a predetermined value, e.g. 10 bytes have been received and are waiting to be read by the CPU, an interrupt (CPU_Rxirq) is sent to the CPU alerting the CPU that it needs to read data from the FIFO buffer.

In addition, once an SPI transmit/receive request is made, which may come at any phase of an instruction cycle, data communication needs to be established between the transmit/receive buffers 210 and 214 and the memory. To avoid structural hazard, such as any conflicts with the CPU memory access, the transmit/receive request is suitably pipelined until the next available clock phase, for example, within one instruction cycle. Pipelining is a technique that may be used in microcontrollers where the microcontroller begins executing a second instruction before the first has been completed. That is, several instructions may be in the "pipeline" simultaneously, each at a different processing stage. A similar memory technique may be used in which the memory loads the requested memory contents into a small cache composed of SRAM and then immediately begins fetching the next memory contents. This can create a two-stage pipeline, where data may be read from or written to SRAM in one stage, and data may be read from or written to memory in the other stage.

Furthermore, cycle stealing techniques can be combined with the pipelining techniques. The cycle stealing techniques may reduce interfering with the CPU's use of the bus interface, thus speeding up processing. The pipelining techniques can increase the rate that data is transferred. By combining the techniques, data transfer rates can be improved without adversely affecting processor speed. As a result, for a 4 Mhz clock rate, the technique can enable a significantly higher data transfer rate, e.g., at 250 Kbytes per second, an improvement of almost twenty times the prior art data transfer rates.

In an exemplary embodiment of the present invention, SPI 108, in a first device, may communicate data to a second device. In an exemplary embodiment, one of the two devices may be a master device which controls the synchronization of the data transfer to the slave device. Although exemplary embodiments may be described herein with microcontroller 100 as the master device, microcontroller 100 may alternatively be the slave device. When SPI 108 is acting as a master device, it may send a clock signal from a clock device to provide synchronization of the data transfer between the master and slave SPI modules. SPI 108 may be configured with a communication line labeled "master out slave in" (MOSI) carrying the output signal of the master device or the input signal for the slave device. SPI 108 is also configured with another communication line labeled "master in slave out" (MISO) carrying the input signal for the master device or the output signal for the slave device.

Furthermore, an interrupt signal may provide the ability to pause or stop the shifting in the slave device to allow the master device to perform other tasks temporarily until it is ready to receive data from the slave device again. It should be noted that every time SPI 108 sends a byte of data, it may receive a byte of data in return. Similarly, every time a piece of data is intentionally received, another piece of data is transmitted regardless of its value. This data may, or may not, be useful data. Further information regarding the SPI transmit and receive buffers, shift registers, and MISO/MOSI operating modes can be obtained by reference to parent U.S. application Ser. No. 09/810,994.

Figure 3:
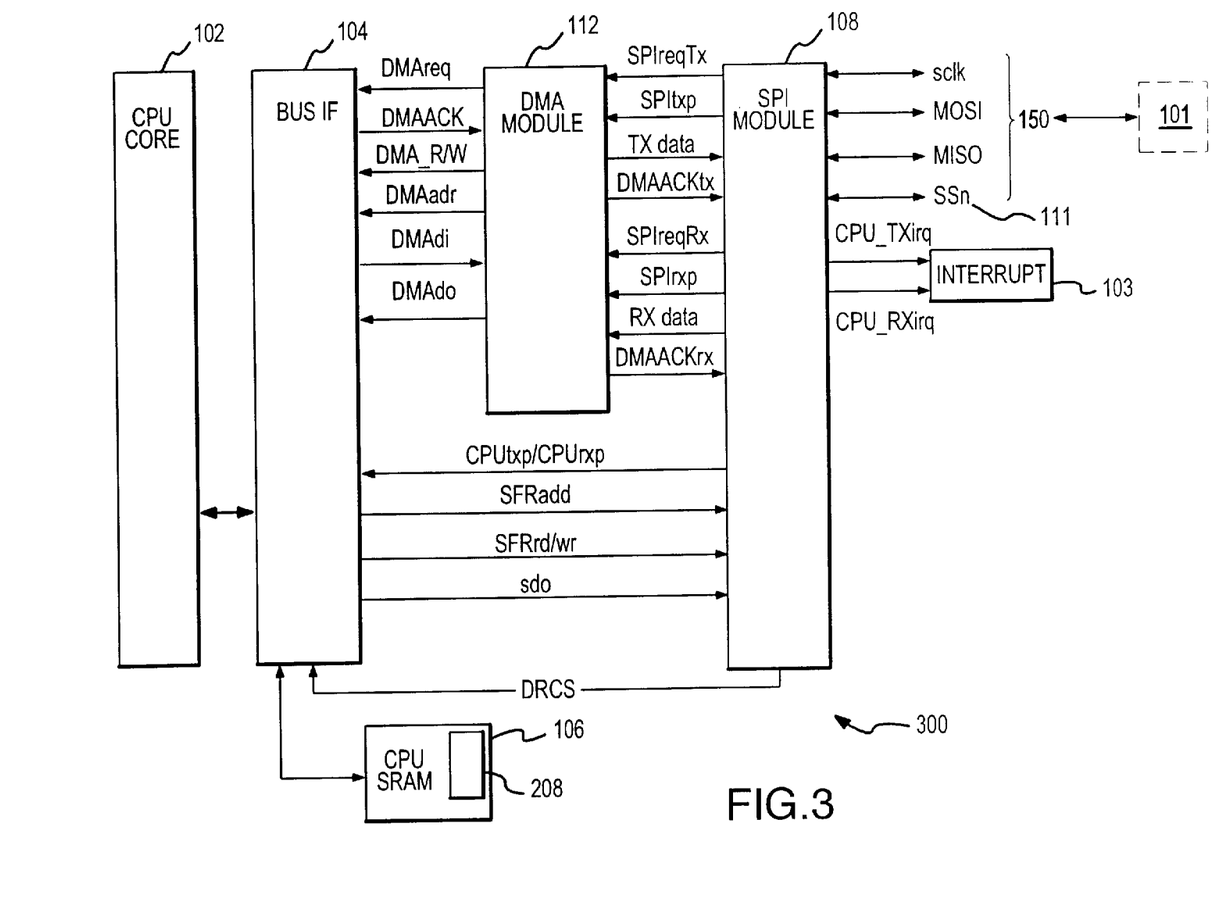
FIG. 3 illustrates an exemplary block diagram of an SPI in accordance with an exemplary embodiment of the present invention.

With reference to FIG. 3, an exemplary SPI configuration 300 is illustrated. In accordance with this exemplary embodiment, SPI configuration 300 shows the interfaces between the SPI module and various peripheral devices. To understand the various operational sequences of SPI configuration 300, an exemplary description is provided. However, it should be noted that the following embodiments are merely for illustration purposes, and the invention is not limited to those disclosed in the illustrative examples.

CPU core 102 may communicate with various devices in SPI configuration 300 via BusIF 104. BusIF 104 may communicate with DMA module 112, SPI module 108, and CPU SRAM module 106. CPU SRAM module 106 may also contain FIFO memory buffer 208. In accordance with an exemplary embodiment of the present invention, DMA module 112 may send several signals to BusIF 104, comprising a DMA request for time on BusIF 104 ("DMAreq"), a DMA read or write signal ("DMA_R/W"), a DMA address signal ("DMAadr") for referencing the FIFO memory address, and a DMA data output signal ("DMAdo") for transmitting the value to be stored in FIFO memory and later transmitted to device 101. DMA module 112 may also receive several signals from BusIF 104 comprising a DMA acknowledgement signal ("DMAack") for indicating that BusIF time is available for use, and a DMA data input signal ("DMAdi") for transmitting the value read from FIFO memory.

DMA module 112 may also send several signals to SPI module 108, such as: a transmit data signal ("Txdata"), a DMA transmit acknowledgement signal ("DMAACKtx") for acknowledging the ability of the DMA to serve the SPI transmit request, and a DMA receive acknowledgment signal ("DMAACKrx") for acknowledging the ability of the DMA to serve the SPI receive request. DMA module 112 may also receive several signals from SPI module 108, such as: ("SPIreqTx") which is a request signal for initiating transmission of data stored in the FIFO memory, a SPI transmitter pointer signal ("SPItxp") for indicating where the data can be found in FIFO memory, ("SPIreqRX") which is a request signal for initiating the sending of data from the SPI to the FIFO memory, a SPI receiver pointer signal ("SPIrxp") for indicating the correct FIFO address for storing the receive data, and a receive data signal ("RX data").

SPI module 108 may also send signals to BusIF 104 such as: a CPU transmitter pointer and receiver pointer signal ("CPUtxp/CPUrxp") for indicating the correct FIFO memory locations for the CPU to store/read FIFO stored data and data register chip select signal ("DRCS") for causing BusIF 104 to write/read to/from the memory location indicated by the address provided to the buffer by SPI 108. In addition, SPI module 108 may also receive signals from BusIF 104 such as: a virtual SFR address signal ("SFRadd") for causing data to be stored in FIFO 208; a virtual SFR read/write instruction signal ("SFR_rd/wr"), and a virtual SFR data out signal ("sdo").

Communication path 150 facilitates communications between SPI 108 of a first device 100 and a second device 101 which may also include a second SPI 108. Communication line 150 may further include lines such as a master in slave out line (MISO), a master out slave in line (MOSI), and an SPI-clock line (SCLK). The SCLK signal will either be sent out from a master device to a slave device driving the synchronization and shifting in the slave device, or the SCLK signal will be received from a master device into this device as a slave device. Every serial peripheral interface SPI 108 will operate in either a master or slave mode. In a master mode, the MISO operates as an input/receiver line, and the MOSI line operates as an output/transmitter line. In slave mode, the SPI-MISO line operates as an output or transmission line and the MOSI line operates as an input or receiver line. Furthermore, interrupt signal, SSn 111, may provide the ability to pause or stop the shifting in the slave device to allow the master device to perform other tasks temporarily until it is ready to receive data from the slave device again. In addition, interrupts 103, CPU_Txirq and CPU_Rxirq, may be sent from SPI 108 to CPU 102 as discussed above.

Figure 4A:
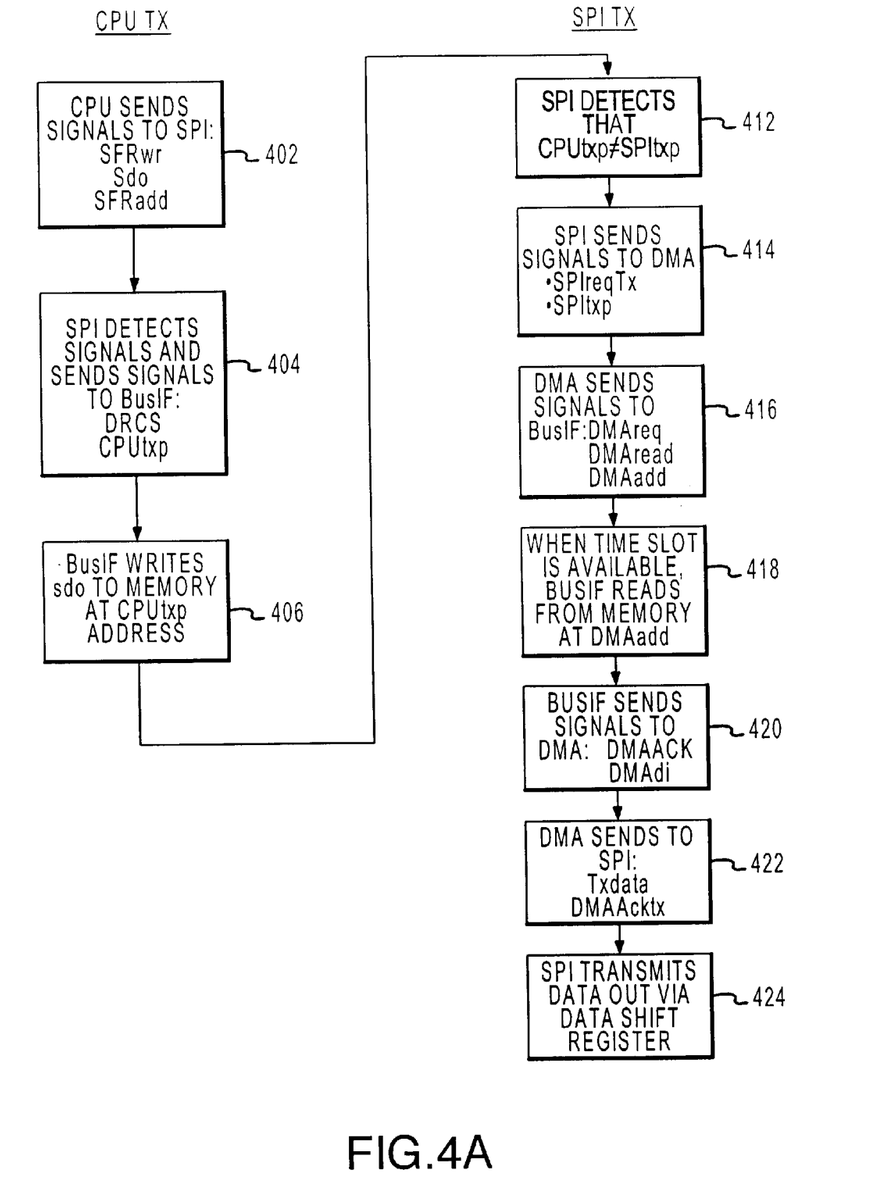
FIG. 4A illustrates an exemplary CPU/SPI transmit technique in accordance an exemplary embodiment of with the present invention.

With reference to an exemplary CPU transmit technique in accordance with an exemplary embodiment of the present invention, as illustrated in FIG. 4A, CPU 102 may send data to FIFO buffer memory and from there to SPI for transmitting. For example, in step 402, CPU 102 may send data or instructions (sdo), a write signal (SFRwr), and an address (SFRadd) to BusIF 104 which forwards the information to SPI 108. As far as CPU 102 is concerned, CPU 102 is writing the data or instructions to a SFR. However, the hardware in SPI 108 recognizes the SFRadd as a special VSFR address and sends DRCS and CPUtxp signals to BusIF 104. The DRCS signal causes BusIF 104 to store the data, still held on BusIF 104, to a particular location (CPUtxp) in FIFO buffer memory (Steps 404 and 406). The SPI hardware maintains address pointers (CPUtxp) referencing the next available memory location for transmitting from the CPU to the FIFO buffer memory.

In a further exemplary SPI transmit embodiment, the SPI may keep track of the data accumulating in the FIFO memory. The SPI may detect, in a step 412, that data is waiting to be transferred when the CPUtx pointer 221 is not equal to the SPItx pointer 223. In an optional embodiment, the SPI may detect, in a step 412, that data is waiting to be transferred when a predetermined threshold value has been reached for the difference between these two pointers. In step 414, the SPI may send a request signal (SPItx) and address information (SPItxp) to the DMA asking that the data be transferred out of the FIFO memory to the SPI for transmission to another device 101. In step 416, the DMA sends to the BusIF the request (DMAreq), and address (DMAadd) signals and a "read" (DMA_R) signals. The DMA_R signal instructs BusIF 104 to read the data from the DMAadd. The data transfer request is satisfied when time is available on the bus interface. When the bus interface has available cycles it will read the data from the DMAadd in the FIFO memory in a step 418. The data signal (DMAdi) and an acknowledgment signal (DMAACK) may then be sent by the bus interface to the direct memory access module (step 420), on to the SPI (step 422) as Txdata and DMAACKtx, and then out to the destination device via transmit buffer 210 and signal lines 150 (step 424).

Figure 4B:
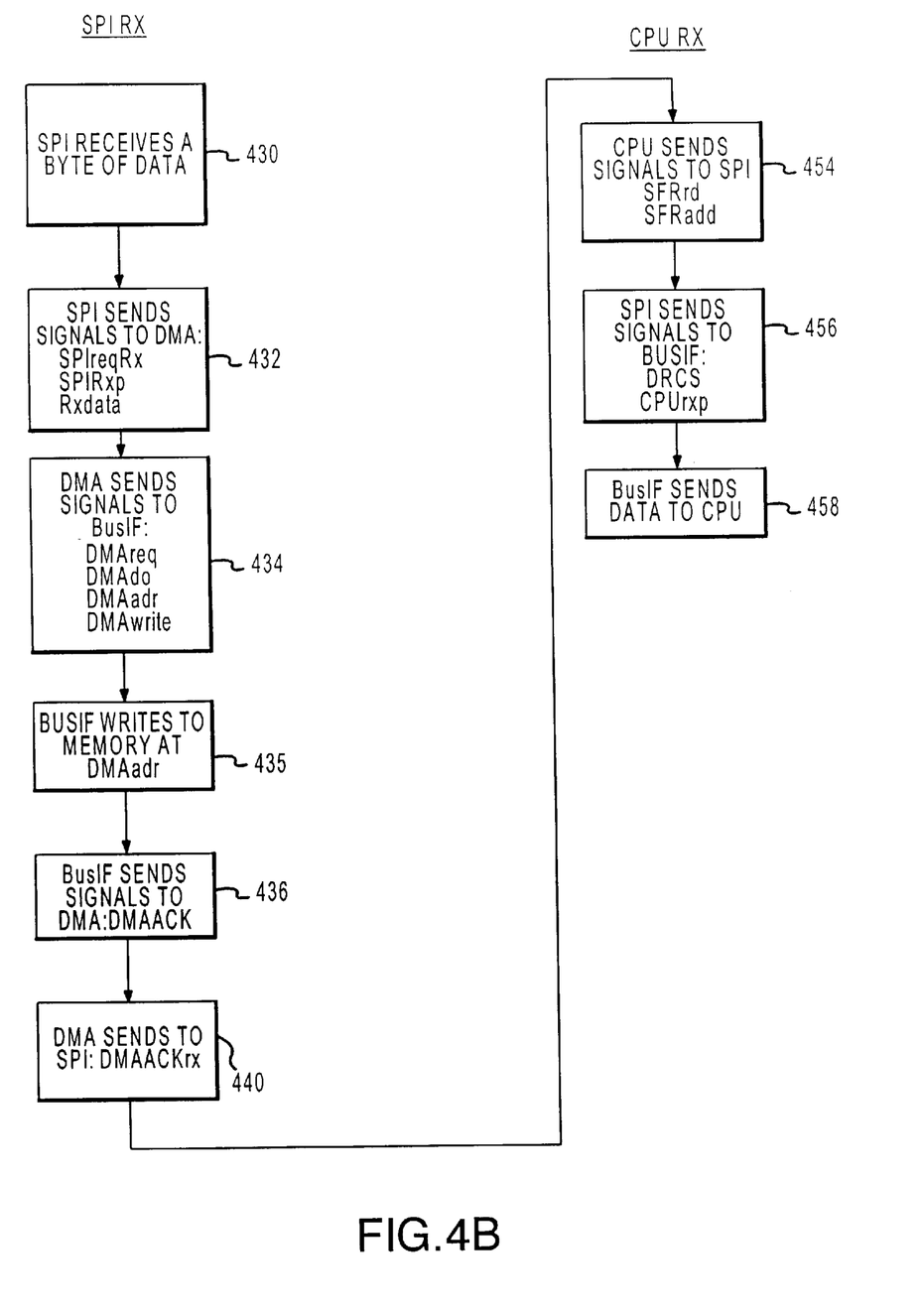
FIG. 4B illustrates an exemplary CPU/SPI receive technique in accordance with an exemplary embodiment of the present invention.

With reference to FIG. 4B, the reverse process may occur when the serial peripheral interface receives data from an associated peripheral device 101, checks whether FIFO buffer is full, and requests the DMA to store the received data in the FIFO immediately. If FIFO buffer is full, then the data is lost. In an exemplary embodiment of the present invention, in a step 430, SPI 108 receives a byte of data. SPI sends a request (SPIreqRx) to the DMA to send the data to the FIFO along with the received byte (Rxdata) and SPI receive pointer (SPIRxp) in a step 432. In step 434, the DMA module in turn may send a DMA request signal (DMAReq), data signal DMAdo, write command (DMAwrite), and FIFO memory address signal (DMAadr) to the BusIF. In step 435, the BusIF may then write the data (DMAdo) to memory at the FIFO memory address (DMAadr). The bus interface acknowledges that it is available for and has written the data by sending a DMA acknowledgement signal (DMAACK) in step 436. The DMA module may then send an acknowledgment signal (DMAACKrx) to the SPI in step 440.

The central processing unit may request to read the data, from what it assumes is a special function register, by sending a read instruction signal (SFRrd) and a virtual SFR address signal (SFRadd) in a step 454. The SPI module may recognize that request via the unique VSFR address and send a Data Register Chip Select (DRCS) signal and FIFO memory address CPUrxp to the BusIF 104 (step 456). The data at that FIFO memory address may be provided through the BusIF 104 to the CPU (step 458).

At the end of every data read or write event, the pointers to the FIFO buffer memory addresses are updated. This updating may involve incrementing the pointer, maintaining the pointer at the present value in the FIFO buffer, or wrapping the pointer around to the beginning of the FIFO buffer. The SPI module may keep track of pointer (SPIrxp) 224 to the memory location where the received data was stored and the pointer (CPUrxp) 222 to the memory location from which the data is to be read by CPU 102. When those pointers are not equal, data is available to be sent to the CPU. In one exemplary embodiment, the level at which interrupt signal 103 is sent is adjustable and may be programmed such that no transmission occurs until a threshold is reached, e.g. 4 bytes. This option provides flexibility in how full the buffer can get before interrupting the CPU to start to empty the buffer.

The above described technique can include "cycle stealing" features. In accordance with another aspect of the present invention, cycle stealing can be employed such that the direct memory access module waits until the CPU is not using the bus interface before the DMA module transfers data between the serial peripheral interface and memory. This can occur by the DMA sending requests to the BusIF for sending or receiving data to or from the memory and then waiting for an acknowledgment signal. Therefore, the CPU's use of the bus interface may not be interrupted in the above described process and CPU processing rate may be enhanced while also increasing the data transmission rate. The data transmission rate may be improved due to the use of, for example, FIFO buffer memory and virtual SFR'S.

In an exemplary embodiment of the present invention, a virtual SFR technique may be applied. For example, the CPU provides data and instructions to the SPI as if the CPU were writing to a SFR; however, no physical SFR buffer exists, and instead that information is actually being written to memory. Furthermore, the SPI accesses the memory through a DMA module using cycle stealing techniques such that interference with the CPU's use of the Bus Interface is reduced. This allows the CPU to work unimpeded by this sort of data transferring. In one exemplary embodiment, an SFR access instruction may have a unique virtual address, for example E8. Once the virtual SFR access is detected, e.g., by same cycle detection, all accesses are redirected to the circular FIFO buffer memory 208, with no additional pipelining necessary.

In accordance with another exemplary embodiment, the use of FIFO buffers may be avoided, and instead data may be sent from the CPU via the BusIF to the SPI for transmitting. Although the SPI may contain a shift register and a transmit buffer, this small buffer may not be sufficient to keep up with data bursts. This embodiment may have the disadvantage of requiring the CPU to wait while the SPI transmitters send the information. In another exemplary embodiment, no virtual SFR technique is used, and instead, the CPU may store the data directly to memory. In this embodiment, the CPU may not have to wait for the SPI to transmit; however, this embodiment may have the undesirable affect of requiring the CPU to keep track of the pointers to the memory location where the data was stored. In yet another exemplary embodiment, the CPU may write to a SFR where the data could then be transferred to computer memory. This embodiment can require more processing steps and still require the CPU to maintain pointers to the location where the data was stored in memory. Finally, although DMA cycle stealing techniques may be omitted from various embodiments of the present invention, these embodiments may realize undesirable delay time when the communication between the FIFO buffer and the SPI device interrupts the CPU's use of the bus interface.

In accordance with another aspect of the present invention, the technique avoids the firmware overhead with minimum hardware control cost. For example, compared to the hardware approach using deeper buffer structures, e.g., with FIFO buffers implemented using flip-flop devices, the current techniques utilize memory, e.g., dynamic or static random access memory (DRAM or SRAM) with direct memory access (DMA). In addition, the technique avoids the use of buffers which otherwise are required, in some applications, to store the data that the CPU wants to write/read.

The present invention has been described above with reference to an exemplary embodiment. However, those skilled in the art will recognize that changes and modifications may be made to the exemplary embodiment without departing from the scope of the present invention. For example, the various components may be implemented in alternate ways, such as varying or alternating the steps in different orders in writing or reading of data. These alternatives can be suitably selected depending upon the particular application or in consideration of any number of factors associated with the operation of the system. In addition, the techniques described herein may be extended or modified for use with other types of devices, in addition to the microprocessor and slave devices described above. These and other changes or modifications are intended to be included within the scope of the present invention.

What is claimed is:

1. A microcontroller for industrial control comprising:
    a central processing unit (CPU);
    a bus interface in communication with the CPU;
    a CPU memory module in communication with the bus interface; the CPU memory module configured to include a FIFO memory buffer;
    a direct memory access module in communication with the bus interface; and
    a serial peripheral interface (SPI) module In communication with the direct memory access module and the bus interface; the SPI module having hardware configured to maintain pointers to addresses within the FIFO memory buffer; the SPI module hardware configured to maintain counters; and the SPI module configured to use the FIFO memory buffer, pointers and counters as a transmission buffer for external communications for creating a virtual special function register.

2. The microcontroller of claim 1 the SPI module further comprising a transmitter buffer and a receiver buffer; wherein the transmitter buffer is configured to transmit data from the FIFO memory buffer, and wherein the receiver buffer is configured to transmit data to the FIFO memory buffer.

3. The microcontroller of claim 1 the SPI module further configured to operate as one of a master device and a slave device.

4. The microcontroller of claim 1 the SPI module further configured to provide a data register chip select signal.

5. The microcontroller of claim 1 the SPI module further configured to provide at least one of a CPU transmitter pointer signal, a CPU receiver pointer signal, a SPI transmitter pointer signal and a SPI receiver pointer signal.

6. The microcontroller of claim 1 wherein said direct memory access module is configured to communicate with the SPI module and the bus interface for providing cycle stealing.

* * * * *